Inventor
John W. FitzGerald

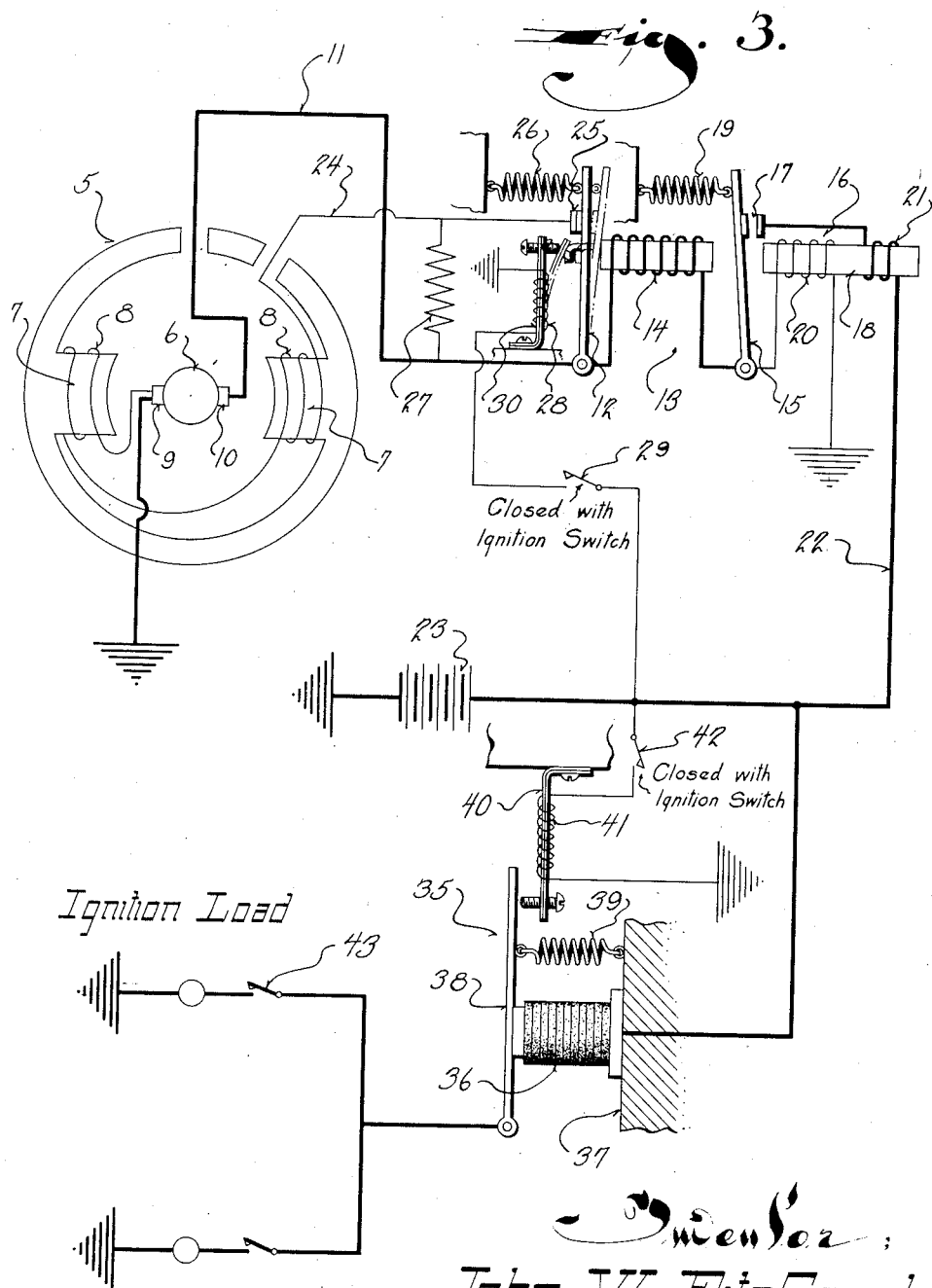

Patented May 11, 1937

2,080,257

UNITED STATES PATENT OFFICE

2,080,257

OUTPUT REGULATOR FOR MOTOR GENERATORS

John W. Fitz Gerald, Milwaukee, Wis., assignor to Briggs & Stratton Corporation, Milwaukee, Wis., a corporation of Delaware Application November 5, 1934, Serial No. 751,571

8 Claims. (Cl. 171—313)

This invention relates to improvements in output regulators for motor generators, particularly those employed in automobiles for keeping the battery charged, and refers more particularly to the electromagnetic type of regulator.

Regulators of this type have proven satisfactory for current control, but did not afford proper voltage control. With these regulators, the charging rate may be maintained at any desired value, which in view of the heavy load now being placed upon the battery as a result of the addition of so many units and appliances on the modern car requiring electrical energy, had to be high.

As a consequence, as the battery became charged, its voltage, by virtue of the constant high charging rate, rose objectionably. This caused excessive "gassing" and consequent loss of electrolyte as well as excessive heating of the battery plates.

With this objection to the existing type of generator output regulator in mind, this invention has an object to provide a regulator control which has a controlling function responsive to voltage as well as amperage so that when the battery becomes fully charged and a predetermined voltage has been obtained, the charging rate is reduced.

More specifically it is an object of this invention to provide means responsive to the voltage of the battery for so affecting a vibrating armature of the regulator that the armature responds to a lower amperage to reduce the effective charging rate sooner than otherwise.

Another object of this invention resides in the provision of voltage responsive means to maintain a predetermined voltage impressed on the ignition and lighting loads under conditions when it is essential that the voltage of the battery should exceed its normal value.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate several complete examples of the physical embodiment of the invention constructed according to the best modes so far devised for the practical application of the principles thereof, and in which:

Figure 3 is a diagrammatic view illustrating the system shown in Figure 1 equipped with an additional voltage regulator to limit the maximum voltage impressed on the ignition and lighting loads.

Figure 1:
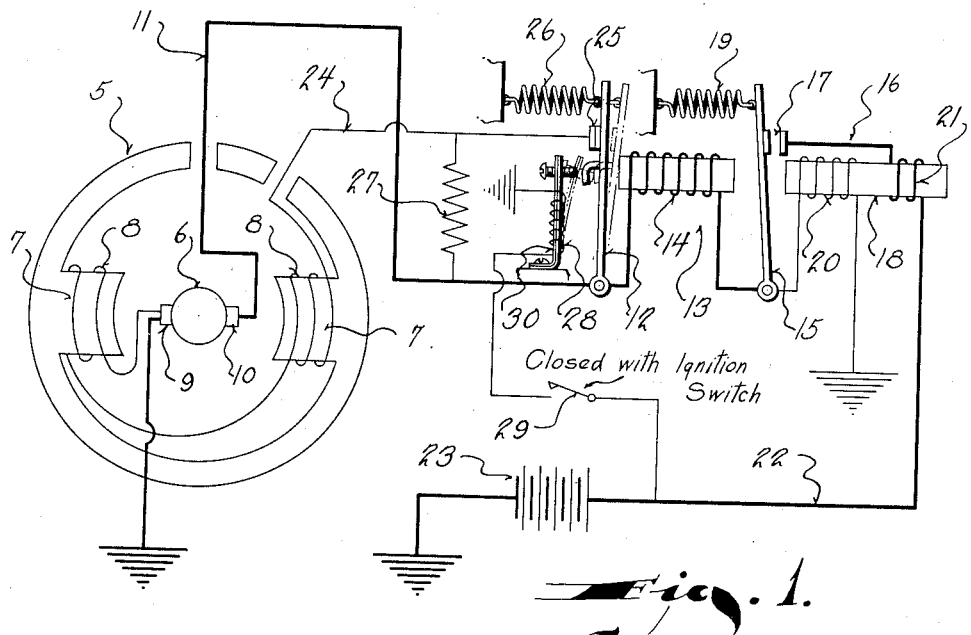
Figure 1 is a diagrammatic illlustration of one embodiment of this invention.

Referring now more particularly to the accompanying drawings in which like numerals indicate like parts throughout the several views, the numeral 5 represents generally a generator having an armature 6 and a field magnet having poles 7. The poles 7 are provided with the customary field windings 8 which are connected in series and shunt wound with respect to the armature 6.

Brushes 9 and 10 provide terminals for the armature windings and the field windings in the customary manner. The brush 9 is connected to the ground and has one end of the field windings 8 connected thereto, and the brush 10 is connected through a conductor 11 to the armature 12 of a conventional vibrating regulator unit indicated generally by the numeral 13.

The vibrating regulator unit 13 besides the armature 12 includes an electromagnet 14 whose coil is connected at one end to the armature and thus to conductor 11. The other end of the coil 14 is connected to the armature 15 of a reverse current cut-out 16 of conventional construction.

As is customary, the cut-out 16 embodies a pair of contacts 17 adapted to be closed when the armature is attracted to its operative position in response to energization of the electromagnet 18 of the cut-out. When the electromagnet 18 is not energized, a spring 19 serves to hold the armature 15 in a position at which the contacts 17 are disengaged.

A shunt coil 20 is permanently connected with the armature 15 and the ground to energize the electromagnet 18 upon initial functioning of the system. Upon energization of the electromagnet, the armature 15 is drawn to its closed position whereupon the series winding 21 of the electromagnet 18 is connected in the circuit which continues through a conductor 22 to one side of the battery 23. The other side of the battery is grounded as shown.

The field winding circuit is completed through a conductor 24 which leads to a pair of normally engaged contacts 25. One of the contacts is mounted on the armature 12 of the regulator, which is yieldingly held in its contact closing position by a spring 26 which acts in opposition to the electromagnet 14. From the closed contacts 25, the field circuit is completed through the armature 12 and the conductor 11 back to the brush 10.

When the current flowing through the electromagnet coil 14 attains a predetermined amperage, the spring 26 is overcome and the armature 12 is drawn to its dotted line position opening the field circuit at the contacts 25 so that the field circuit is then completed only through a resistance 27 connected in shunt with the armature 12.

By the introduction of the resistance 27, the field strength of the generator is appreciably lowered and consequently its output is reduced. In this manner, constant amperage is maintained, the rate of which is determined by the strength of the spring and the size of the air gap between the electromagnet and the armature 12, adjustment of either of these factors effecting adjustment of the charging rate, as is well known.

The system so far described constitutes a conventional constant current vibrating regulator control, which, as pointed out hereinbefore, is objectionable in that it does not prevent the harmful effects of continued charging of the battery at a high rate.

To correct this deficiency of the constant current regulator is the primary purpose of this invention. It is attained by the addition of a voltage responsive element operable to weaken the effect of the spring 26 and thereby cause the armature of the current regulator to respond to a lower amperage.

This voltage responsive element comprises a heater coil 28 having one end grounded and its other end connected through a switch 29 which is closed simultaneously with the closure of the conventional ignition switch, with the live side of the battery. The heater coil 26 is wound upon or mounted in close proximity to a bimetallic driving member 30 adapted to flex in response to a rise in temperature at the heater coil 28 and to engage and assist the electromagnet 14 in moving the armature 12 against the action of its spring as indicated in dotted lines.

Reduction in the charging rate by the introduction of the resistance 27 into the field circuit is thus controlled, not only by the amperage of the current flowing in the output circuit, but also by the voltage of the battery, so that whenever a predetermined voltage is obtained at the battery, the charging rate will be reduced to a "trickle" charge regardless of what the amperage of the current flowing in the output circuit might be.

By the provision of the switch 29 which controls the connection of the heater coil across the battery, and coordinating the functioning of the switch with the opening and closing of the engine ignition switch, draining of the battery through the heater coil when the engine is not operating is prevented.

In the embodiment of the invention illustrated in Figure 1, the desired result is obtained by directly assisting the electromagnet in moving the armature of the vibrating regulator by means of a driver responsive to voltage of the battery. This same result obviously may be obtained in other ways, and in Figure 2 one modified embodiment of the invention is illustrated.

Figure 2:
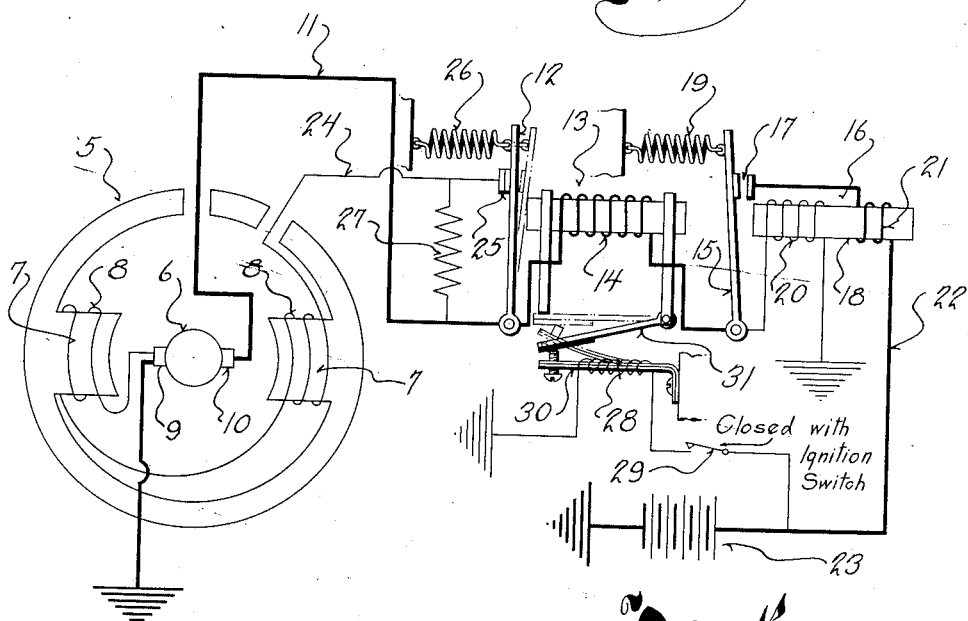
Figure 2 is a diagrammatic illustration similar to Figure 1 illustrating a modified embodiment of the invention.

The general system in Figure 2 is identical to that shown in Figure 1, but instead of moving the armature 12, the desired response of the armature to a lower current flow is obtained by increasing the magnetic strength of the electromagnet. To this end, the bimetallic driver 30, which is flexed by increased temperature at the heater coil 28, moves a magnetic bridging member 31 which forms part of the iron frame of the electromagnet 14, to a position shown in dotted lines at which the magnetic circuit is closed so as to increase the strength of the electromagnet. As a consequence, the armature 12 is drawn to its position at which it effects the introduction of the resistance 27 into the field circuit at a time not only determined by the current flowing in the output circuit, but also by the voltage across the battery.

During cold weather, to fully charge the battery it is necessary that a higher voltage be impressed thereon due to the increased resistance of the electrolyte at lower temperatures. Consequently, the functioning of the voltage responsive element must be retarded. This is effected automatically by the reduction in the ambient temperature of the heater coil 28 and by placing the coil in a position where it will be affected by the air blast from the engine fan.

The increased voltage of the battery, however, results in impressing an objectionably high voltage upon the lighting and ignition loads, causing the burning out of lamp bulbs and the burning of breaker points. To overcome this objection, an additional voltage responsive control is provided to regulate the voltage impressed on the ignition and lighting loads. One embodiment of this expedient is shown in Figure 3.

In the system shown in this figure, the circuit connections and the manner in which the charging rate is reduced are identical to that shown in Figure 1. Added to this system is a voltage responsive control indicated generally by the numeral 35. This control comprises an adjustable resistance 36 shown in the present instance as a stack of carbon disks compressed between a fixed support 37 and a movable arm 38 held in its position maintaining the stack in compression by a spring 39.

The resistance 36 is connected in series with the ignition and lighting loads so that adjustment of the resistance 36 effects a desired adjustment of the voltage impressed upon the ignition and lighting loads. Such adjustment of the resistance 36 to prevent the impression of an excessive voltage on the ignition and lighting loads is effected by a bimetallic driving member 40 adapted to flex in response to a temperature rise at a heater coil 41 wound about or mounted in close proximity to the bimetallic driver 40.

The heater coil 41 is connected across the battery to be voltage responsive upon the closure of a switch 42, which, like the switch 29 is closed simultaneously with the closure of the conventional ignition switch shown at 43 in Figure 3.

The adjustment of the control 35 is such that whenever the voltage across the battery exceeds a desired maximum, the arm 38 will be moved by the driving member 40 to increase the resistance of the resistor 36 and thereby prevent the voltage impressed on the ignition and lighting loads from exceeding a predetermined maximum.

From the foregoing description taken in connection with the accompanying drawings, it will be readily apparent to those skilled in the art to which this invention appertains, that this invention affords a simple, but effective manner of controlling the output of a generator in response to both current and voltage and that it provides means for preventing harmful effects arising from continued charging of a battery at a high rate and also provides simple means for limiting the maximum voltage impressed on the ignition and lighting loads.

What I claim as my invention is:

1. In combination with a generator, a storage battery connected with the generator and adapted to be charged thereby and a current responsive regulator for controlling the output of the generator, thermal means operable by the voltage across the battery but only upon the attainment of a predetermined maximum voltage for rendering the current responsive regulator operable at a lower amperage than that for which it is set to operate.

2. In combination with a generator, a storage battery connected with the generator to be charged thereby and a current responsive regulator including an electromagnet operable to maintain a constant current output of the generator upon attainment of a predetermined amperage in the output circuit of the generator, a thermally responsive control operable by the voltage across the battery but only upon the attainment of a predetermined maximum voltage for increasing the effectiveness of the electromagnet of said current responsive regulator.

3. The combination with a generator having an output circuit and a field winding, a battery connected with the output circuit of the generator to be charged thereby and a current responsive regulator including an electromagnet to be energized by current flowing in the output circuit and operable to control the strength of the field winding, of means responsive to a predetermined voltage across the battery for increasing the effectiveness of the electromagnet, said last named means comprising a heater element connected across the battery, and a thermally responsive driving member operable by a temperature rise at said heating element.

4. The combination with a generator having an output circuit and a field winding, a battery connected with the output circuit of the generator to be charged thereby and a current responsive regulator including an electromagnet to be energized by current flowing in the output circuit and operable to control the strength of the field winding, of means responsive to a predetermined voltage across the battery for causing the current responsive regulator to respond to a lower amperage comprising a thermostatic driving member, a heater coil connected across the battery placed in juxtaposition to the thermostatic driving member to effect the same thermally, and means acted upon by the thermostatic driving member to increase the effectiveness of the electromagnet of said current responsive regulator.

5. The combination with a generator, a storage battery connected with the generator to be charged thereby and a current responsive regulator responsive to current flowing from the generator to regulate the output of the generator including an electromagnet, of voltage responsive means for increasing the effectiveness of the electromagnet comprising a heater element connected across the battery, a thermostatic driving member adapted to be influenced by the temperature of the heating element, and means acted upon by the thermostatic driving member to increase the effective strength of the electromagnet.

6. The combination with a generator, a storage battery connected with the generator to be charged thereby, and a current regulator responsive to the amperage of the generator output current for regulating the generator output and including an electromagnet and a movable armature acted upon by the electromagnet, of voltage responsive means responsive to the attainment of a predetermined maximum voltage across the battery for increasing the effectiveness of the electromagnet comprising a heater element connected across the battery, and a thermally responsive driving member mounted to act on the armature and assist the electromagnet in actuating the armature, said thermally responsive driving member being disposed in juxtaposition to the heating element to be influenced by a temperature rise thereat.

7. The combination with a generator, a storage battery connected with the generator to be charged thereby and a current responsive regulator to control the output of the generator including an electromagnet, an armature operable by energization of the electromagnet and a switch controlled by the movement of the armature, of means to increase the effectiveness of the electromagnet upon the attainment of a predetermined voltage across the battery comprising a magnetic member movable to a position increasing the strength of the electromagnet, a thermally responsive driving member to move said magnetic member to said position, and a heater element connected across the battery and mounted in juxtaposition to the thermally responsive member to influence the same and cause it to act upon the impression of predetermined voltage on the heater element.

8. In combination, a generator, an output circuit connected to said generator, a storage battery connected across said output circuit, a current-responsive regulator adapted to limit the generator output to a predetermined value, and a second regulator responsive both to ambient temperature and to generator voltage only in excess of a certain value varying with ambient temperature and adapted to adjust the value at which the first-named regulator limits the generator output.

JOHN W. FITZ GERALD.